US012718208B2

(12) United States Patent
Huang et al.

(10) Patent No.: US 12,718,208 B2
(45) Date of Patent: Aug. 25, 2026

(54) VALUE TRANSFER METHOD AND APPARATUS, AND DEVICE

(71) Applicant: Tencent Technology (Shenzhen) Company Limited, Shenzhen (CN)

(72) Inventors: Sicong Huang, Shenzhen (CN); Xunmao Zheng, Shenzhen (CN); Longzhi Tan, Shenzhen (CN); Xiaodan Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 61 days.

(21) Appl. No.: 18/438,296

(22) Filed: Feb. 9, 2024

(65) Prior Publication Data

US 2024/0185194 A1 Jun. 6, 2024

Related U.S. Application Data

(63) Continuation of application No. PCT/CN2023/116624, filed on Sep. 1, 2023.

(30) Foreign Application Priority Data

Oct. 10, 2022 (CN) ......................... 202211236867.8

(51) Int. Cl.
*G06Q 20/10* (2012.01)
*G06Q 20/32* (2012.01)
(Continued)

(52) U.S. Cl.
CPC ........... *G06Q 20/10* (2013.01); *G06Q 20/321* (2020.05); *G06Q 20/3829* (2013.01); *G06Q 20/401* (2013.01)

(58) Field of Classification Search
None
See application file for complete search history.

(56) References Cited

U.S. PATENT DOCUMENTS

| | | | | |
|---|---|---|---|---|
| 10,540,492 | B1 * | 1/2020 | Norris, III | G06F 21/36 |
| 11,886,560 | B1 * | 1/2024 | Bhubhut | G06V 40/1312 |

(Continued)

FOREIGN PATENT DOCUMENTS

| | | | |
|---|---|---|---|
| CN | 104200143 | A | 12/2014 |
| CN | 107491966 | A | 12/2017 |

(Continued)

OTHER PUBLICATIONS

Duezguen et al., "Sok: A Systematic Literature Review of Knowledge-Based Authentication on Augmented Reality Head-Mounted Displays," Aug. 2022, ACM ISBN 978-1-4503-9670-7/22/08. https://doi.org/10.1145/3538969.3539011 (Year: 2022).*

(Continued)

*Primary Examiner* — Jamie R Kucab

(74) *Attorney, Agent, or Firm* — Morgan, Lewis & Bockius LLP

(57) ABSTRACT

This application discloses a value transfer method performed by a wearable device. The method includes: obtaining a value transfer request; displaying verification prompt information matching the value transfer request in a virtual environment of the wearable device; obtaining interactive data generated by a target object in the virtual environment based on the verification prompt information; performing value transfer verification based on the interactive data; and performing value transfer according to the value transfer request after the value transfer verification succeeds. This reduces operation complexity of the target object during value transfer verification, and does not require the target object to remove the wearable device, thereby ensuring the (Continued)

user experience and helping balance the user experience and value transfer security.

20 Claims, 7 Drawing Sheets

(51) Int. Cl.
*G06Q 20/38* (2012.01)
*G06Q 20/40* (2012.01)

(56) References Cited

U.S. PATENT DOCUMENTS

2014/0125574 A1* 5/2014 Scavezze ................ G06F 21/34
345/156
2018/0158036 A1 6/2018 Zhou et al.
2019/0171807 A1* 6/2019 Gadge ..................... G06F 3/017
2019/0205851 A1* 7/2019 Sinha ................... G06Q 20/321
2019/0325407 A1 10/2019 Zhou et al.
2020/0004948 A1* 1/2020 Zhu ....................... G06T 19/006
2020/0410464 A1* 12/2020 Nair ........................ G06F 3/017
2022/0038891 A1* 2/2022 duPont ................... G06V 10/25
2023/0418365 A1* 12/2023 Alexander ............ H04L 65/612

FOREIGN PATENT DOCUMENTS

CN 112199657 A 1/2021
CN 112698723 A 4/2021

OTHER PUBLICATIONS

Tencent Technology, ISR, PCT/CN2023/116624, Nov. 22, 2023, 2 pgs.
Tencent Technology, WO+IPRP, PCT/CN2023/116624, Apr. 15, 2025, 5 pgs.

* cited by examiner

VALUE TRANSFER METHOD AND APPARATUS, AND DEVICE

CROSS-REFERENCE TO RELATED APPLICATIONS

This application is a continuation application of PCT Patent Application No. PCT/CN2023/116624, entitled "VALUE TRANSFER METHOD AND APPARATUS, AND DEVICE" filed on Sep. 1, 2023, which claims priority to Chinese Patent Application No. 202211236867.8, entitled "VALUE TRANSFER METHOD AND APPARATUS BASED ON WEARABLE DEVICE, AND DEVICE" filed on Oct. 10, 2022, all of which is incorporated by reference in its entirety.

FIELD OF THE TECHNOLOGY

This application relates to the field of computer technologies, and specifically to a value transfer method and apparatus, and a device.

BACKGROUND OF THE DISCLOSURE

Currently, there are mainly two payment confirmation methods for purchasing a product or service provided within an extended reality (XR) application by using an XR device.

In the first method, a numerical password popup box is presented directly through a front panel of the XR device, and a user inputs a key by pointing to each digit one by one through a peripheral such as a handle or a glove. Such an input manner has a series of problems such as being easy to accidentally touch and difficult to confirm. Consequently, the digital key is relatively short, making it easy to crack the digital key. In the second method, confirmation is performed and fees are charged through a mobile terminal bound to the XR device used by the user. The user needs to remove the XR device, and open a mobile phone for confirmation. Because the XR device focuses on an immersive experience, removing the XR device seriously affects the sense of immersion of the user, causing the user to have low willingness to pay. It can be learned that in the related art, there are problems of complex operations and affecting the user experience during payment verification by users.

SUMMARY

Embodiments of this application provide a value transfer method and apparatus, and a device, which can reduce operation complexity of a user during value transfer verification.

According to a first aspect, an embodiment of this application provides a value transfer method, performed by a wearable device, and including:

- obtaining a value transfer request;
- displaying verification prompt information matching the value transfer request in a virtual environment of the wearable device;
- obtaining interactive data generated by a target object in the virtual environment based on the verification prompt information;
- performing value transfer verification based on the interactive data; and
- performing value transfer according to the value transfer request after the value transfer verification succeeds.

According to another aspect, an embodiment of this application provides a non-transitory computer-readable storage medium, storing a computer program, the computer program being suitable for execution by a processor of a wearable device and causing the wearable device to perform the value transfer method according to any one of the foregoing embodiments.

According to another aspect, an embodiment of this application provides a wearable device, including a processor and a memory, the memory storing a computer program that, when executed by the processor, causes the wearable device to perform the value transfer method according to any one of the foregoing embodiments.

The embodiments of this application provide a value transfer method and apparatus, and a device. A value transfer request is obtained. Subsequently, verification prompt information matching the value transfer request is displayed in a virtual environment of a wearable device based on the value transfer request, the verification prompt information being used for instructing a target object to perform value transfer verification. Then, interactive data generated by the target object in the virtual environment based on the verification prompt information is obtained, and value transfer verification is performed based on the interactive data. After the value transfer verification succeeds, value transfer is performed according to the value transfer request. In the embodiments of this application, the verification prompt information is displayed in the virtual environment of the wearable device to instruct the target object to perform value transfer verification. Subsequently, the target object may perform interaction in the virtual environment to generate the interactive data. This reduces operation complexity of the target object during value transfer. In addition, value transfer verification is performed in the virtual environment of the wearable device, and the target object can perform value transfer verification without removing (such as taking off) the wearable device, thereby ensuring the user experience and helping balance the user experience and value transfer security.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person skilled in the art may still derive other drawings from these accompanying drawings without creative efforts.

DESCRIPTION OF EMBODIMENTS

Figures 1, 2:
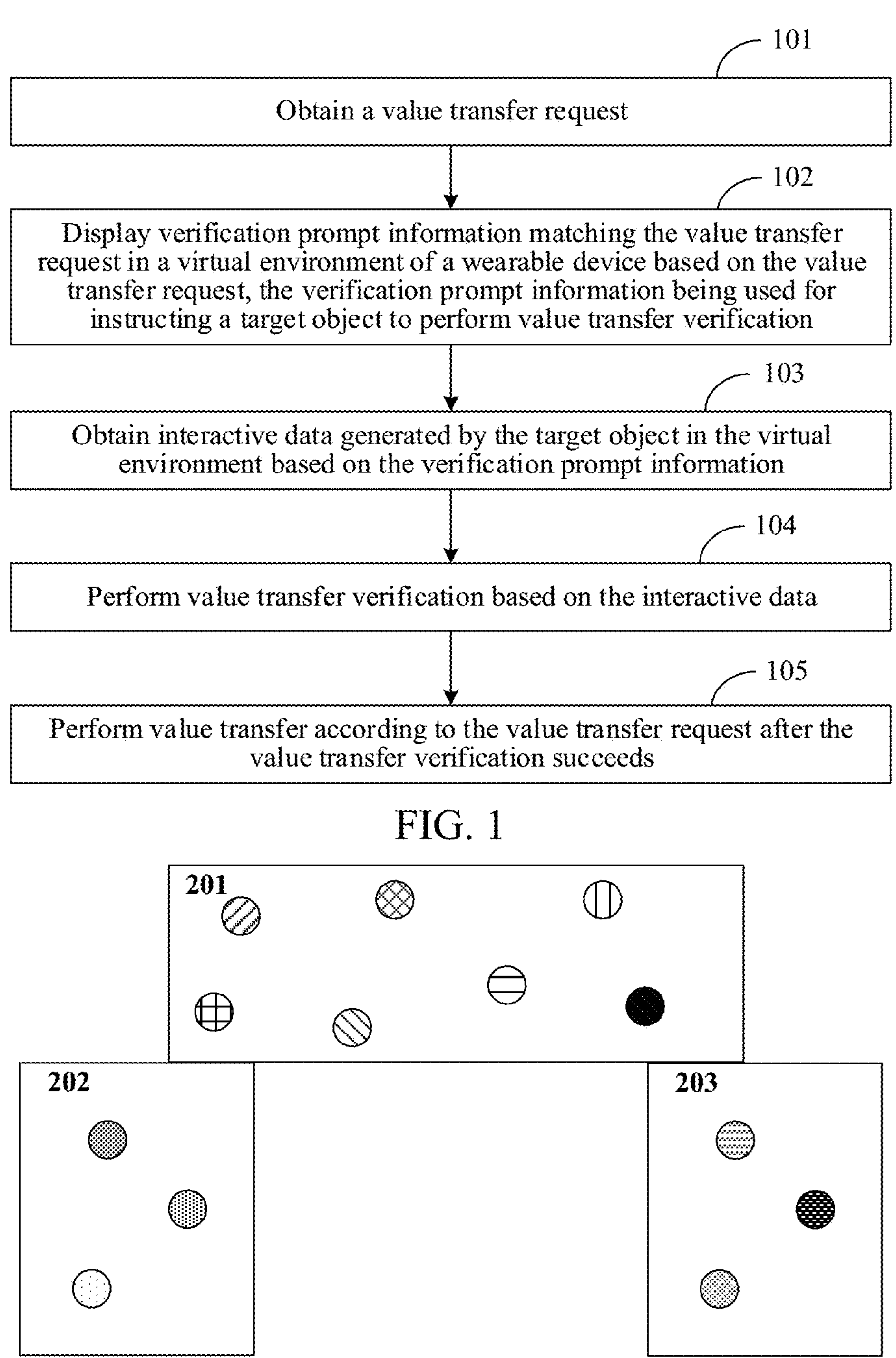
FIG. 1 is a schematic flowchart of a value transfer method according to an embodiment of this application.
FIG. 2 is a schematic diagram of a first application scenario of a value transfer method according to an embodiment of this application.

The following clearly and completely describes the technical solutions in the embodiments of this application with reference to the accompanying drawings in the embodiments of this application. Apparently, the described embodiments are merely some embodiments of this application rather than all of the embodiments. All other embodiments obtained by a person skilled in the art based on the embodiments of this application without creative efforts shall fall within the protection scope of this application.

The embodiments of this application provide a value transfer method and apparatus, a wearable device, and a storage medium. Specifically, the value transfer method of the embodiments of this application may be performed by a wearable device. The wearable device may be a VR device, an AR device, an MR device, an XR device, or the like.

The embodiments of this application are applicable to various scenarios, including but not limited to, payment verification, intelligent payment, in-application purchase, and the like.

First, some nouns or terms appearing in a process of describing the embodiments of this application are explained as follows:

Virtual reality (VR) is a technology for creating and experiencing a virtual world. A virtual environment is generated through calculation and is a type of multi-source information (VR mentioned in this specification at least includes visual perception, may further include auditory perception, tactile perception, and motion perception, and even further includes taste perception, olfactory perception, and the like). A fused and interactive three-dimensional dynamic scene of the virtual environment and the simulation of entity behaviors are achieved, allowing users to be immersed in the simulated VR environment. In this way, applications in maps, games, videos, education, healthcare, simulation, collaborative training, sales, assistance in manufacturing, maintenance, restoration, and other various virtual environments are achieved.

Augmented reality (AR) is a technology that calculates camera attitude parameters of a camera in a real world (or referred to as a three-dimensional world or a true world) in real time during acquisition of an image by the camera, and adds a virtual element to the image according to the camera attitude parameters. The virtual element includes, but is not limited to: an image, a video, and a three-dimensional model. An objective of the AR technology is to connect a virtual world to the real world on a screen for interaction.

Mixed reality (MR) is a simulated scenery that integrates sensory inputs (such as virtual objects) created by a computer and sensory inputs from a physical scenery or their representations. In some MR sceneries, the sensory inputs created by the computer can be adapted to changes in the sensory inputs from the physical scenery. In addition, some electronic systems for presenting MR sceneries can monitor an orientation and/or a position relative to the physical scenery, so that a virtual object can interact with a real object (that is, a physical element from the physical scenery or a representation thereof). For example, the system can monitor movement, so that a virtual plant appears stationary relative to a physical building. XR is a concept that includes VR, AR, and MR, and represents a technology that creates an environment that connects the virtual world and the real world together and a user can interact with the environment in real time.

An XR device is a device combining a real environment with a virtual environment and human-machine interaction, and performs calculation by using a computer technology and a wearable device. X represents a variable, which can be a current or future spatial calculation technology. AR, MR, VR, and regions within these and such may be included. A degree of virtualization thereof may range from partial sensor input to immersive virtualization, each of which is considered as VR.

An XR application is an application running on the XR device, and has a specific form that may be a current format of an Android application package (APK), or a future format of an iPhone OS application (IPA) file.

In-XR-application purchase refers to a payment scenario within an XR application of purchasing a product or service provided in the XR application.

An XR payment risk control scenario refers to malicious or non-compliant behaviors achieved through cracking, unauthorized access, and theft of the XR device. Common examples include stealing devices of other people for purchase, bypassing restrictions for underage payment through cracking, and the like.

XR payment risk control refers to a control system that circumvents a risk control scenario and other behaviors.

A digital wallet refers to having a particular numerical balance. A user can recharge the balance by consuming real money or can purchase an in-application product by consuming the balance.

Payment confirmation refers to a case of confirming a current payment behavior and verifying whether a digital wallet belongs to a purchaser.

A personal identification number (PIN), also translated as a user personal identification number, and often referred to as a PIN number, is an access code including a string of digits and used for authenticating an identity of a user and authorizing the user to enter a system.

A payment PIN number refers to a key used for a payment confirmation step.

An XR payment channel refers to a payment channel for achieving in-XR-application purchases within an XR application, such as system account balance, third party payment, or digital renminbi.

Currently, during purchasing of a product or a service in an application of an XR device, two payment verification modes are mainly used. The first mode is to directly use a digital wallet of the XR device for payment and directly perform confirmation by inputting a PIN number through the XR device. When using this mode, a user needs to recharge in advance the digital wallet bound to the XR device in a mobile terminal, such as a mobile phone. Subsequently, during payment for fee deduction with the XR device, a password popup box is presented on an XR front panel. The user performs fee deduction confirmation by pointing to each digit one by one through a handle cursor. After the confirmation, the fee is deducted from the balance in the digital wallet to complete the purchase. However, based on the current technology, on the XR device, a main input source for the user is an input device such as a handle or a glove. Such an input device has a series of problems of being easy to accidentally touch and difficult to confirm, bringing a poor user experience to the user. In addition, due to the foregoing reasons, a length of a digital PIN number used for payment verification is usually designed to be short, making it easy to crack the PIN number, and leading to security risks. Moreover, the method of recharging first and then consuming requires the user to consciously recharge the balance in the digital wallet first. This causes a poor user experience to a user who uses the purchase function for the first time. In addition, because the user needs to continuously accumulate a particular balance for future consumption, the flexibility of user funds is reduced. The second mode is to perform verification through a mobile terminal. In this mode, during payment for fee deduction with the XR device, an SMS message is transmitted to a mobile terminal bound to a purchase account, usually a mobile phone of a user. The user needs to remove the XR device and tap on the SMS message on the mobile phone, to access a fee deduction channel of the mobile terminal for fee deduction. However, this mode in which the user needs to remove the XR device and open the mobile phone for confirmation seriously affects the user experience. Because the XR device focuses on an immersive experience, the fee deduction process of taking off and then wearing the XR device seriously affects the sense of immersion of the user, causing the user to have low willingness to pay. It can be learned that, it is difficult for the current payment verification mode of the XR device to achieve a balance between the user experience and security.

Therefore, the embodiments of this application provide a value transfer method. Verification prompt information is displayed in a virtual environment of a wearable device to instruct a target object to perform value transfer verification. Subsequently, the target object may perform interaction in the virtual environment to generate interactive data. This reduces operation complexity of the target object during the value transfer verification. In addition, the value transfer verification is performed in the virtual environment of the wearable device, and the target object can perform the value transfer verification without removing (such as taking off) the wearable device, thereby ensuring the user experience and helping balance the user experience and value transfer security.

Details are described below separately. The order of describing the following embodiments is not intended to limit the priority order of the embodiments.

The embodiments of this application provide a value transfer method. The method may be performed by a terminal or a server, or may be performed jointly by a terminal and a server. In the embodiments of this application, description is provided by using an example in which the value transfer method is performed by a server.

Figure 5:
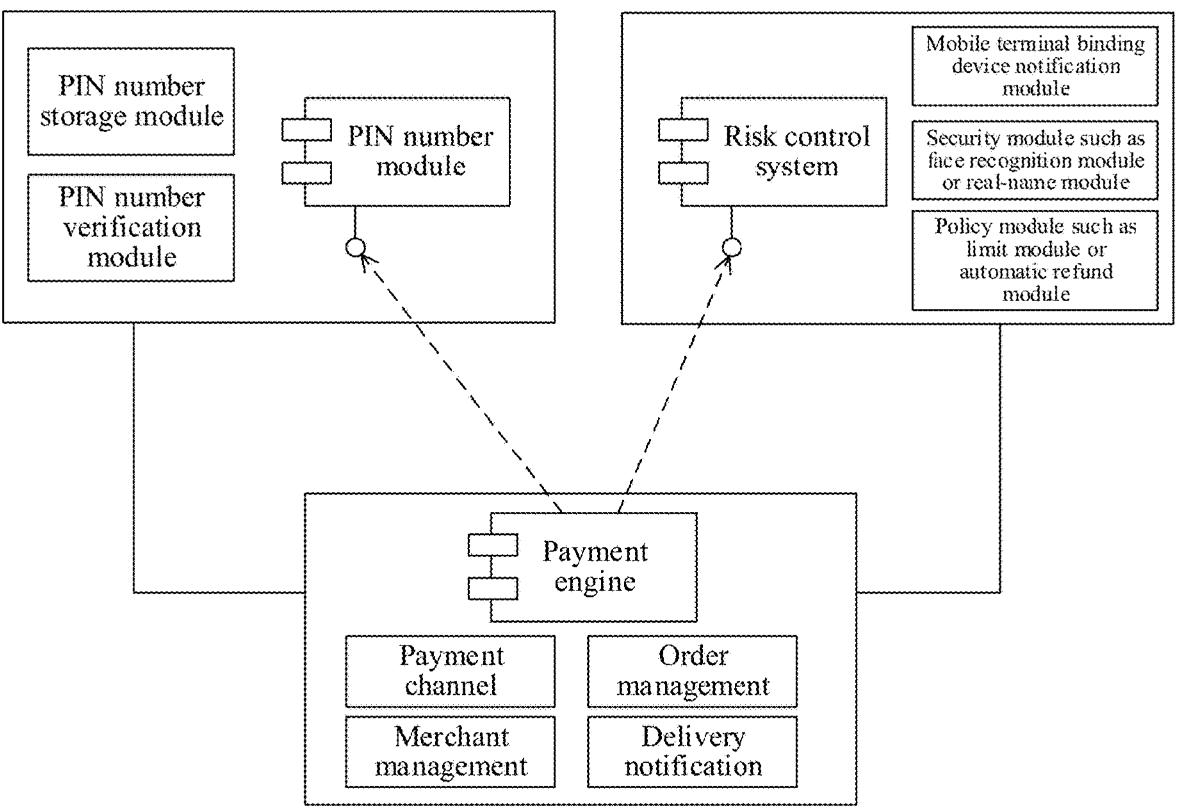
FIG. 5 is a schematic diagram of a fourth application scenario of a value transfer method according to an embodiment of this application.
Figure 6:
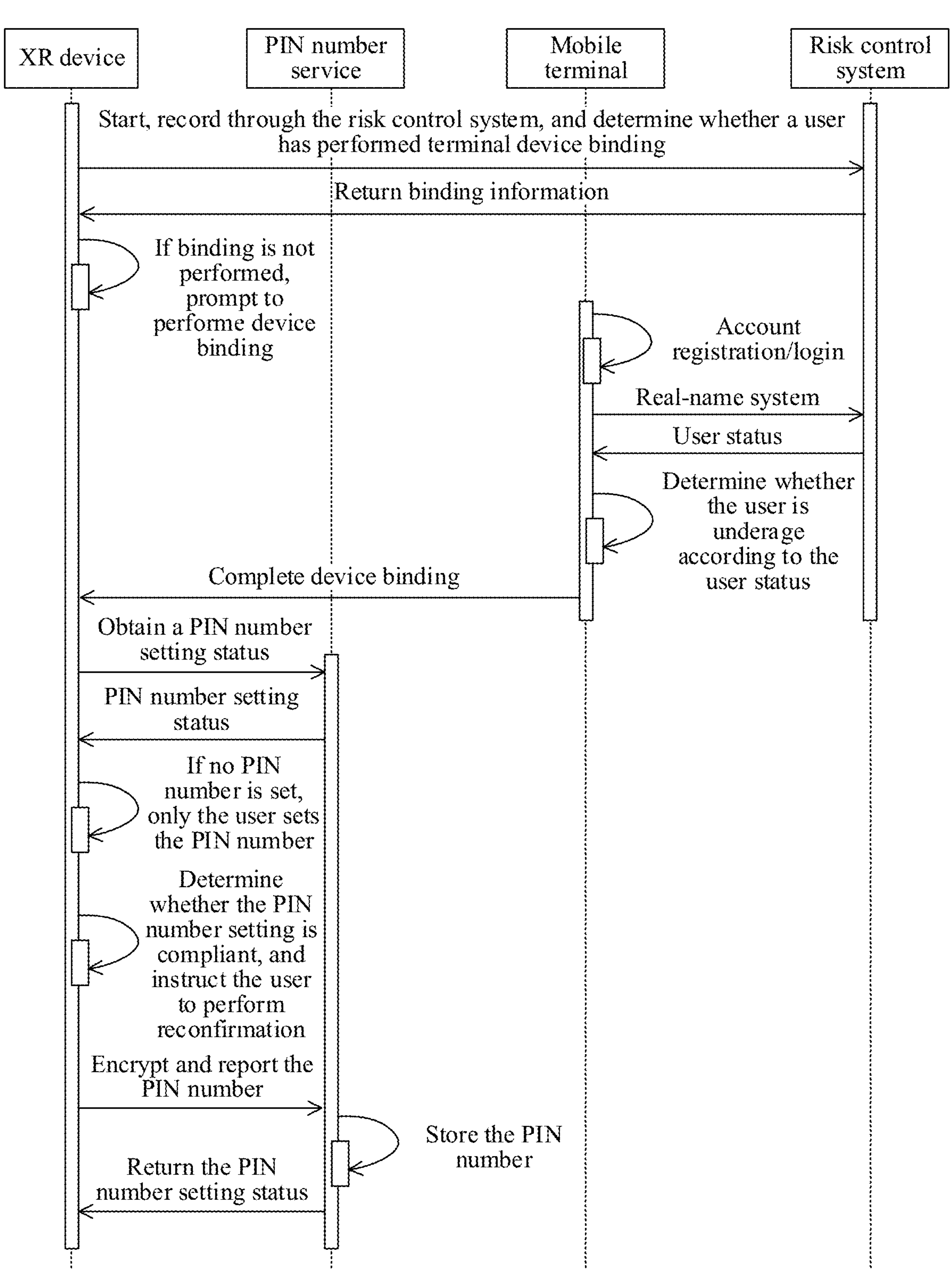
FIG. 6 is a schematic diagram of a first time sequence of a value transfer method according to an embodiment of this application.
Figure 7:
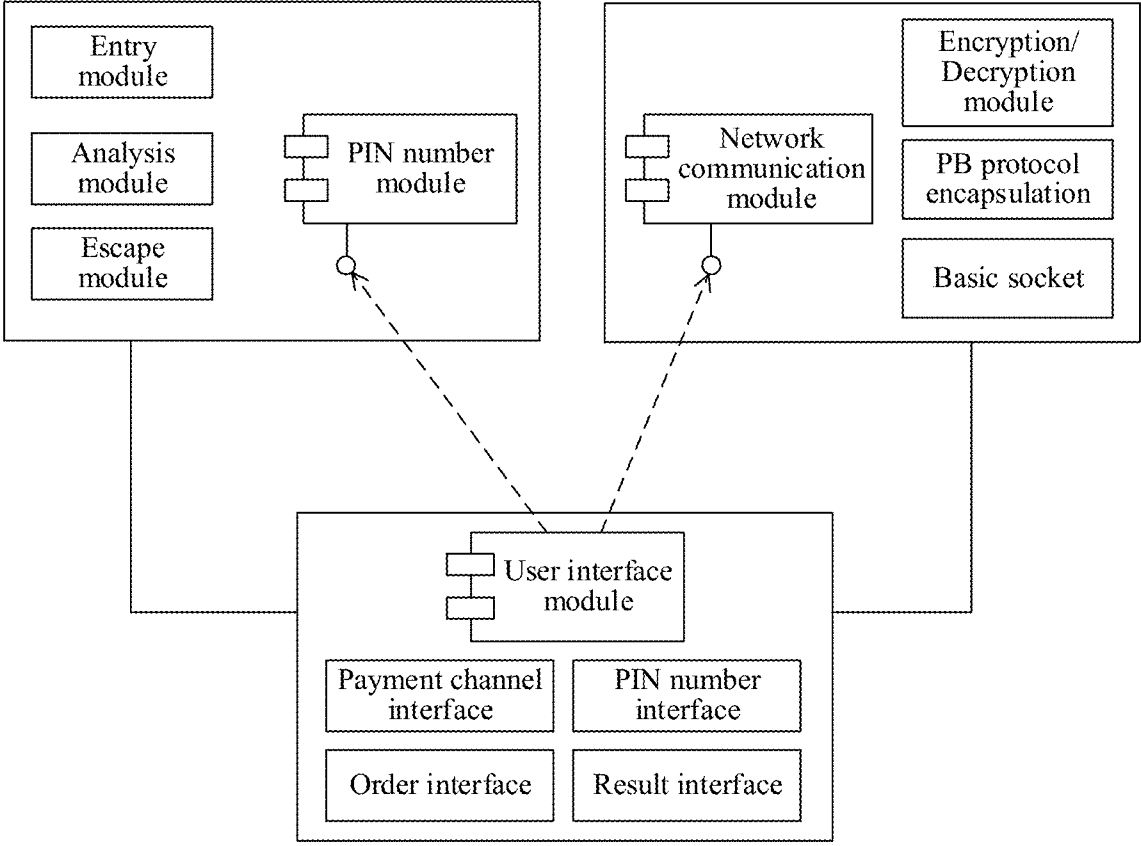
FIG. 7 is a schematic diagram of a fifth application scenario of a value transfer method according to an embodiment of this application.
Figure 8:
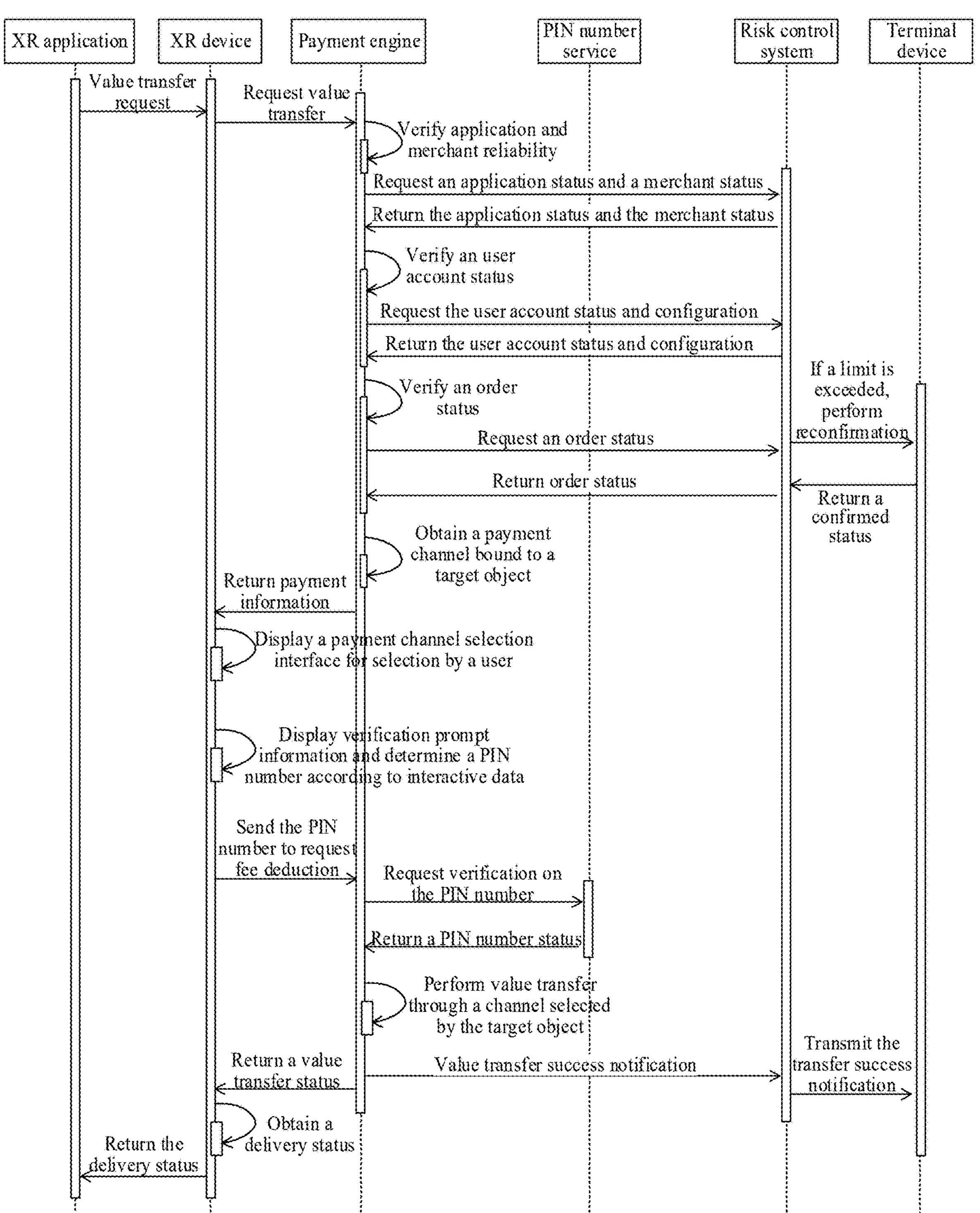
FIG. 8 is a schematic diagram of a second time sequence of a value transfer method according to an embodiment of this application.

Referring to FIG. 1 to FIG. 8, FIG. 1 is a schematic flowchart of a value transfer method according to an embodiment of this application, FIG. 2 to FIG. 4, FIG. 5, and FIG. 7 are each a schematic diagram of an application scenario of a value transfer method according to an embodiment of this application, and FIG. 6 and FIG. 8 are each a schematic diagram of a time sequence of a value transfer method according to an embodiment of this application. The method may be performed by a wearable device. The wearable device mainly may include an XR device, an AR device, an MR device, a VR device, or the like. The method includes the following steps:

Step 101: Obtain a value transfer request.

The value transfer request may be initiated by a target object. The target object may be any user using the wearable device. When the target object uses a wearable device and makes a purchase, such as clicking/tapping on a product or a service to purchase in an XR application, a value transfer request is generated. Specifically, the value transfer request may include product information of the product purchased by the target object, merchant information of the purchased product, an account status of the target object, an order status, and the like. Verification may be performed on the merchant information, an order price, or the like to verify merchant reliability and verify whether the order price exceeds a risk control threshold. When the merchant is reliable and the order price does not exceed the risk control threshold, a verification interface may be displayed to instruct the target object to perform value transfer verification.

Specifically, when the wearable device is first started, that is, when the target object uses the wearable device for the first time, the wearable device may instruct the target object to perform device binding and real-name authentication, and instruct the target object to set a value transfer verification mode. The wearable device may provide various value transfer verification modes, such as a pattern verification mode, a motion verification mode, a peripheral verification mode, a voice verification mode, a character password verification mode, a fingerprint verification mode, an iris verification mode, and an NFC verification mode. The target object may select one or more of the modes for setting.

Step 102: Display verification prompt information matching the value transfer request in a virtual environment of the wearable device based on the value transfer request, the verification prompt information being used for instructing a target object to perform value transfer verification.

Therefore, the displaying of the verification prompt information in the virtual environment of the wearable device enables the target object to perform value transfer verification while wearing the wearable device. That is, the target object can perform value transfer verification without removing (such as taking off) the wearable device, thereby helping ensure the user experience.

The value transfer verification is mainly used for verifying an identity of the target object. Specific, a preset agreed mode, such as a pattern verification mode, a motion verification mode, or a peripheral verification mode may be used, to instruct the target object to input a corresponding verification key. When the verification key input by the target object is consistent with an agreed key agreed in advance, it can be considered as the target object, or a value transfer request generated with the permission of the target object.

In some embodiments, when the value transfer verification mode is the pattern verification mode, verification prompt information corresponding to the pattern verification mode may be displayed in the virtual environment. For example, the verification prompt information corresponding to the pattern verification mode may be displayed on a front, left, and right display panel of the target object. For example, a plurality of patterns with different shapes or colors are randomly displayed, and the target object is instructed to select a plurality of patterns from the plurality of patterns with different shapes or colors as a pattern verification key, for the value transfer verification.

In some embodiments, when the value transfer verification mode is the motion verification mode, verification prompt information corresponding to the motion verification mode may be displayed in the virtual environment, and may be used for instructing the target object to input a motion through a peripheral such as a handle. The motion input by the target object is played in a virtual scene and used as a motion verification key, for the value transfer verification.

In some embodiments, when the value transfer verification mode is the peripheral verification mode, verification prompt information corresponding to the motion verification mode may be displayed in the virtual environment, and may be used for instructing the target object to click/tap the same button or different buttons a plurality of times through a peripheral such as a handle, as peripheral verification keys, for the value transfer verification.

In some embodiments, in a payment scenario, the value transfer request may alternatively be a payment request. Correspondingly, the value transfer verification specifically may be payment verification. This is not limited in this application.

Step 103: Obtain interactive data generated by the target object in the virtual environment based on the verification prompt information.

The interactive data may include data triggered by the target object through a peripheral, image data of the target object acquired by the wearable device through a camera, or voice data acquired by a voice acquisition apparatus, or the like.

Step 104: Perform value transfer verification based on the interactive data.

In some embodiments, the verification prompt information may include pattern verification prompt information. Step 102 may mainly include: displaying the pattern verification prompt information in the virtual environment of the wearable device, the pattern verification prompt information including a plurality of patterns and first prompt information, the first prompt information being used for instructing the target object to select a plurality of target patterns from the plurality of patterns, and the plurality of patterns each having a different shape or color.

In this embodiment, the interactive data includes a plurality of target patterns, and step 104 may mainly include: determining whether the plurality of target patterns match a preset pattern key prestored in the wearable device; and when the plurality of target patterns match the preset pattern key prestored in the wearable device, determining that the value transfer verification succeeds; or when the plurality of target patterns do not match the preset pattern key prestored in the wearable device, determining that the value transfer verification fails.

The displaying the pattern verification prompt information in the virtual environment may be specifically: displaying a plurality of patterns on a display panel of the wearable device, the plurality of patterns having different shapes or colors. The target object selects a particular number of patterns from the plurality of patterns as a pattern verification key. The wearable device verifies whether the pattern verification key is the same as a prestored verification key to perform value transfer verification.

Specifically, the wearable device may randomly display a plurality of patterns on the display panel. The target object may select a plurality of patterns from the plurality of patterns as a pattern verification key. The wearable device determines whether the pattern verification key selected by the target object is the same as a prestored preset pattern key to perform value transfer verification. It is easily understood that the plurality of patterns displayed by the wearable device on the display panel definitely include a plurality of patterns in the preset pattern key.

In this embodiment, before the displaying verification prompt information matching the value transfer request in a virtual environment of the wearable device based on the value transfer request, the method further includes: displaying a pattern key setting interface, the pattern key setting interface displaying a plurality of patterns to be selected, and the plurality of patterns to be selected each having a different shape or color; and determining, as the preset pattern key, a pattern selected by the target object from the plurality of patterns to be selected. In some embodiments, the pattern selected by the target object from the plurality of patterns to be selected may be stored as the preset pattern key.

It is easily understood that before the value transfer verification is performed, the target object needs to preset the preset pattern key. For example, the setting may be performed when the wearable device is used for the first time and after device binding is completed. The setting may be performed on a bound terminal or wearable device. Referring to FIG. 2, as an example, the preset pattern key is set on the wearable device. In this case, different patterns may be displayed on a front panel 201, a left side panel 202, and a right side panel 203 of an XR device to instruct the target object to select a plurality of patterns from the different patterns as the preset pattern key. It is easily understood that FIG. 2 uses the same shape and different colors as an example for description. During actual application, each pattern may alternatively have a different shape. To improve payment security and ensure memorability of the key, the number of patterns to be selected may be set to 4 to 6.

In some embodiments, the verification prompt information may include motion verification prompt information. The wearable device may be connected to at least one peripheral. Step 102 may mainly include: displaying the motion verification prompt information in the virtual environment of the wearable device, the motion verification prompt information being used for instructing the target object to input a motion verification key within a first preset time through the peripheral.

In this embodiment, the interactive data includes the motion verification key. Step 104 may mainly include: in response to obtaining the interactive data within the first preset time by the wearable device, verifying whether the motion verification key matches a preset motion key prestored in the wearable device; and when the motion verification key matches the preset motion key prestored in the wearable device, determining that the value transfer verification succeeds; or when the motion verification key does not match the preset motion key prestored in the wearable device, determining that the value transfer verification fails.

Performing verification by using the motion verification mode may be specifically as follows: The target object makes a particular motion through a peripheral such as a handle, as a motion verification key. The wearable device verifies whether the motion verification key is the same as the prestored preset motion key to perform the value transfer verification.

Specifically, the wearable device may display the entered motion of the target object in a virtual scene in real time. After the target object completes the motion, it is determined whether the motion entered by the target object is consistent with the preset motion key to determine whether the value transfer verification succeeds. It is easily understood that to improve payment security and ensure memorability of the motion, the motion verification key may be limited to a dynamic motion with duration ranging from two seconds to five seconds.

In this embodiment, before the displaying verification prompt information matching the value transfer request in a virtual environment of the wearable device based on the value transfer request, the method may further include: displaying a motion key entry interface, the motion key entry interface being used for instructing the target object to enter a baseline motion key by using the peripheral; and in response to detecting that the target object has entered the baseline motion key by using the peripheral, determining the baseline motion key entered by the target object by using the peripheral as the preset motion key. For example, the baseline motion key entered by the target object by using the peripheral may be stored as the preset motion key.

Figures 3, 4:
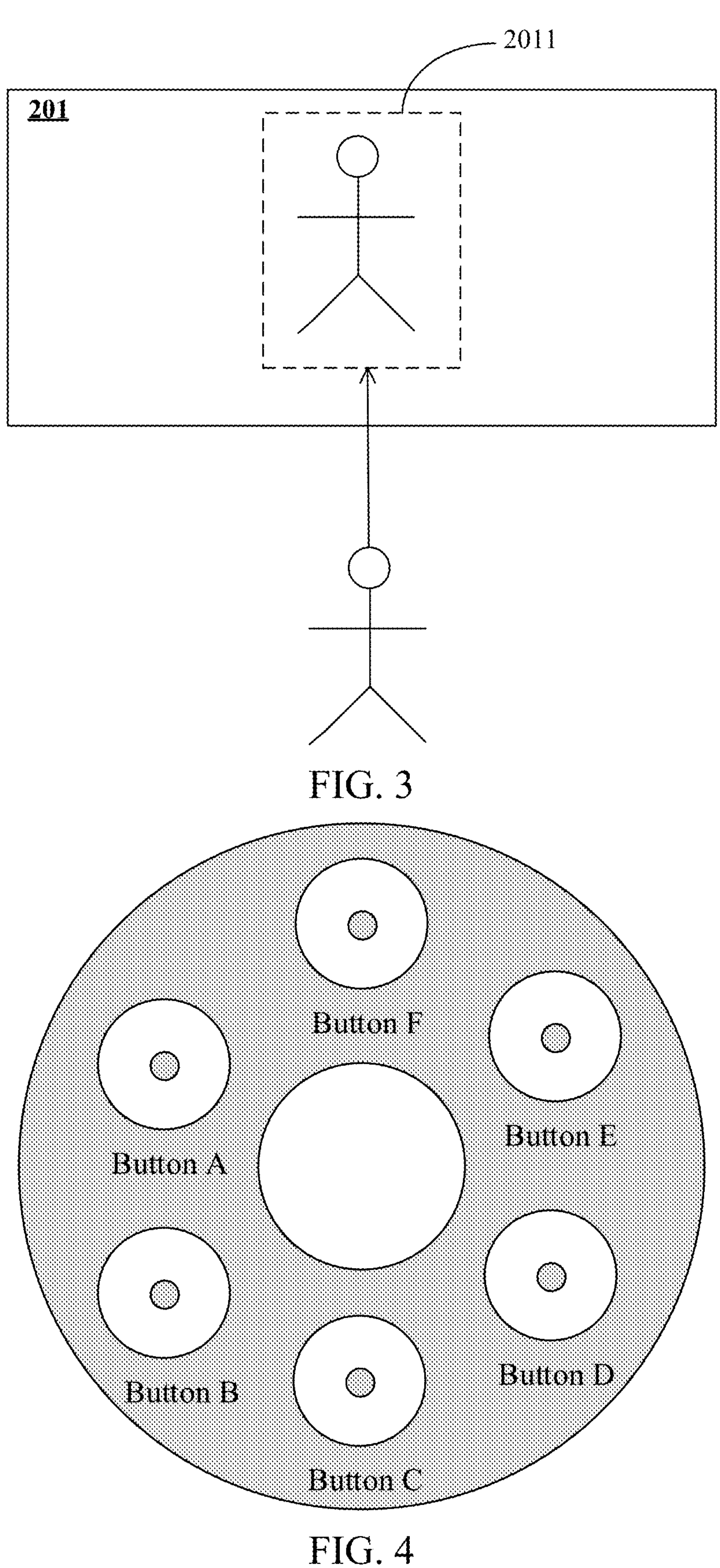
FIG. 3 is a schematic diagram of a second application scenario of a value transfer method according to an embodiment of this application.
FIG. 4 is a schematic diagram of a third application scenario of a value transfer method according to an embodiment of this application.

It is easily understood that before the value transfer verification is performed, the target object needs to preset the preset motion key. For example, the setting may be performed when the wearable device is used for the first time and after device binding is completed. The setting may be performed on the wearable device. Referring to FIG. 3, as an example, the preset motion key is set on the wearable device. For example, the wearable device may display a motion key entry interface on a front panel 201 to instruct the target object to enter a motion key. The target object may enter the motion key through a peripheral such as a handle, and the front panel 201 may display a motion 2011 of the target object in real time. After the target object enters the motion key for the first time, the motion of the first entry may be played on the motion key entry interface, and the target object is required to enter the motion for the second time. The motion of the second entry is compared with the motion of the first entry to determine whether they are consistent and whether there is a problem of parsing exception, or the like. When the motions of the two entries are consistent and there is no problem of parsing exception, the motion entered by the target object is determined as the baseline motion key, and the baseline motion key is determined as the preset motion key. For example, the baseline motion key may be stored as the preset motion key. It is easily understood that to improve value transfer security and improve the efficiency of value transfer verification, motion duration of the preset motion key can be limited to between two seconds and five seconds.

In some embodiments, the verification prompt information may include trigger verification prompt information, and the wearable device is connected to at least one peripheral. Step 102 may mainly include: displaying the trigger verification prompt information in the virtual environment of the wearable device, the trigger verification prompt information being used for prompting the target object to input a trigger verification key within a second preset time through the peripheral, the peripheral including a plurality of buttons, and the trigger verification key being a combination of the number of times and an order for triggering at least one of the plurality of buttons.

In this embodiment, the interactive data may include the trigger verification key. Step 104 may mainly include: in response to obtaining the interactive data within the second preset time by the wearable device, determining whether the trigger verification key matches a preset trigger key prestored in the wearable device; and when the trigger verification key matches the preset trigger key prestored in the wearable device, determining that the value transfer verification succeeds; or when the trigger verification key does not match the preset trigger key prestored in the wearable device, determining that the value transfer verification fails.

For example, the peripheral is an external device of the wearable device. The peripheral may include an input device for inputting information and an output device for outputting information. For example, the peripheral may be a handle or a glove.

Performing verification by using a trigger verification mode may be specifically as follows: The target object clicks/taps on at least one of a plurality of buttons on the peripheral in a particular order, and each button may be clicked/tapped a plurality of times. The wearable device uses a combination of the order and the number of times for triggering the at least one button by the target object trigger as the trigger verification key. The wearable device verifies whether the trigger verification key is the same as the prestored preset trigger key to perform the value transfer verification.

Specifically, referring to FIG. 4, as an example, the peripheral is a handle. The handle includes a plurality of buttons (a button A to a button F). The target object may trigger any one of the button A to the button F as shown in FIG. 4 a plurality of times. For example, the target object may trigger the button A three times, trigger the button E twice, and trigger the button D once. The wearable device may determine triggering of the button A three times, triggering of the button E twice, and triggering of the button D once as the trigger verification key, and determine whether the trigger verification key is the same as the preset trigger key to determine whether the value transfer verification succeeds.

In this embodiment, before the displaying verification prompt information matching the value transfer request in a virtual environment of the wearable device based on the value transfer request, the method further includes: displaying a trigger key setting interface, the trigger key setting interface being used for instructing the target object to input a baseline trigger key through the peripheral; and obtaining the baseline trigger key input by the target object through the peripheral, and determining the baseline trigger key as the preset trigger key. For example, the baseline trigger key may be stored as the preset trigger key.

It is easily understood that before the value transfer verification is performed, the target object needs to preset the preset trigger key. For example, the setting may be performed when the wearable device is used for the first time and after device binding is completed. The trigger key setting interface may be displayed. The trigger key setting interface may instruct the target object to input the baseline trigger key through the peripheral. The baseline trigger key input by the target object through the peripheral is obtained, and the baseline trigger key is determined as the preset trigger key. For example, the handle shown in FIG. 4 is used as an example. The trigger key setting interface may instruct the target object to trigger at least one of the buttons A to F a plurality of times, then record an order and the number of times for triggering each button by the target object to obtain the baseline trigger key, and determine the baseline trigger key as the preset trigger key. It is easily understood that, to facilitate memorization and ensure key security, a cumulative trigger number of all buttons of the preset trigger key may be set to about 10 times.

In this embodiment, various value transfer verification modes suitable for the XR device are designed, such as, a pattern verification mode, a motion verification mode, or a peripheral verification mode. This is different from a commonly used numeric keyboard password, and there is no need to use the handle to point to each digit one by one to input the key. Therefore, operation complex is reduced and diversity and security of the value transfer verification mode are improved. In this way, the user experience during value transfer confirmation is improved without affecting value transfer security, thereby balancing the user experience and security in a value transfer verification scenario.

Step 105: Perform value transfer according to the value transfer request after the value transfer verification succeeds.

After obtaining the value transfer request, the wearable device may display a payment channel selection interface in the virtual environment, for instructing the target object to select a payment channel. After the target object selects a payment channel, the verification prompt information may be displayed in the virtual environment, for instructing the target object to perform the value transfer verification. When the value transfer verification succeeds, value transfer is performed through the payment channel selected by the target object. In some embodiments, value transfer success information may be further displayed in the virtual environment to prompt the target object that the value transfer succeeds.

In this embodiment, before the obtaining a value transfer request, the method may further include: in response to starting of the wearable device, determining whether the wearable device has been bound to a terminal device; and when the wearable device is not bound to the terminal device, instructing the target object to perform an operation of binding to the terminal device; or when detecting that the target object has completed the binding to the terminal device, instructing the target object to perform an operation of binding to a payment channel.

Specifically, after being bound to the terminal device, the wearable device may instruct the target object to sign up for payment channel binding. Specifically, the wearable device can sign up with the bound terminal device for the payment channel binding. A manner of signing up for binding may include at least third-party payment signing, digital renminbi signing, or the like. For example, after obtaining the value transfer request, the wearable device displays the payment channel selection interface. When the target object selects the third-party payment mode, the target object is instructed to perform value transfer verification. After the verification succeeds, value transfer is performed in a manner of third-party signing, that is, a payment fee is deducted through a third-party payment channel.

In some embodiments, the value transfer request includes a value amount to be transferred. Before the displaying verification prompt information matching the value transfer request in a virtual environment of the wearable device based on the value transfer request, the method may further include: when the value amount to be transferred exceeds a preset value amount, transmitting a value transfer notification to the terminal device bound to the wearable device, the value transfer notification being used for confirming the value transfer request by the target object; and receiving confirmation information from the terminal device bound to the wearable device, the confirmation information being generated after the confirmation of the value transfer request. In response to the confirmation information returned by the terminal device, the step of displaying verification prompt information matching the value transfer request in a virtual environment of the wearable device based on the value transfer request may be performed.

The value amount to be transferred is a product price corresponding to the value transfer request. The preset value amount may be customized by the target object, or automatically set by the system to a relatively large value. When the value amount to be transferred exceeds the preset value amount, the value transfer notification is transmitted to the terminal device bound to the wearable device, such as a user mobile phone. The target object may determine, through the mobile phone, whether to continue the value transfer. The determining may be performed through an SMS message notification or an in-application notification. After being bound to the terminal device, the wearable device may be further bound to a third party application of the terminal through an official account provided by the wearable device. During the transmission of the notification, it may be pushed through the official account.

In this embodiment, the method may further include: transmitting a value transfer success notification to the terminal device bound to the wearable device after value transfer is performed according to the value transfer request.

Specifically, considering a risk control scenario such as device fee stealing, and a top-up by an underage user, after the value transfer succeeds, the value transfer success notification may be transmitted to the terminal device bound to the wearable device, such as a mobile phone. The target object can quickly find and stop abnormal behaviors in a timely manner through a mobile phone notification.

In this embodiment, after the transmitting a value transfer success notification to the terminal device bound to the wearable device, the method may further include: when a refund request transmitted by the terminal device bound to the wearable device is received within preset duration after the value transfer success notification is transmitted, performing a refund operation in response to the refund request.

Specifically, when finding abnormal behaviors, the target object can directly initiate a refund request within a mobile phone application. An XR system can automatically respond to the refund request within the preset duration, such as five minutes, to perform a refund operation and claims back the purchased product. In this way, the target object can control the payment behavior of the XR device through the bound terminal device.

It is easily understood that when the target object needs a refund after the preset duration after a deduction notification is transmitted, the target object may initiate the refund request through human customer service or by filing a complaint.

It is easily understood that after the value transfer request is obtained, that is, after the value amount to be transferred is obtained, when the value amount to be transferred exceeds the preset value amount, the value transfer notification is transmitted to the bound terminal device for confirmation. After the value transfer succeeds, the value transfer success notification is transmitted to the bound terminal device again for confirmation. Such a twice-confirmation risk control mode can effectively allow the target object to identify and intercept purchase behaviors that do not meet expectations, thereby avoiding losses to the assets of the target object.

In this embodiment, the method may further include: receiving user information of the target object from the terminal device bound to the wearable device; and performing real-name verification on the target object according to the user information, or determining whether the target object is an underage user according to the user information.

The terminal device binding, value transfer verification, risk control, and other functions may mainly be implemented through system backend services of the wearable device. Referring to FIG. 5, in this embodiment, the system backend services of the wearable device may mainly include three parts: a payment engine, a risk control system, and a PIN number service. The PIN number service may mainly include a PIN number storage module and a PIN number verification module that may be mainly configured to store and verify different forms of PIN numbers, and may be used during system initialization or payment verification. The PIN number is a verification key, including various forms, such as a pattern PIN number, a motion PIN number, and a peripheral PIN number. The risk control system may mainly include a mobile terminal binding device notification module, a security module such as a face recognition module or a real-name module, and a policy module such as a limit module or an automatic refund module. The mobile terminal binding device notification module may be mainly configured to manage communication with a bound mobile terminal device, such as twice-confirmation during value transfer and notification after the value transfer succeeds. The security module may be mainly configured to implement face recognition, real-name system, and other functions used during first binding and subsequent hitting of risk control. The policy module is mainly configured to implement amount limit management, automatic refund, and other functions. The payment engine mainly includes payment channel, order management, merchant management, delivery notification, and other subsystems. The payment channel may be mainly used for implementing a deduction capability of a supported channel. The order management may be mainly used for implementing running accounting and other functions. The merchant management may be mainly used for merchant entry management, merchant sharing, and other functions. The delivery notification may be mainly used for external notification and retry service functions.

Specifically, referring to FIG. 6, as an example, the wearable device is an XR device. When the XR device is started, the XR device may determine, through a risk control system, whether the XR device is bound to a terminal device. When the XR device is not bound to the terminal device, the target object is instructed to normally use the XR only after binding to a mobile terminal. Specifically, the XR device may provide a two-dimensional code for device binding. The target object may scan the two-dimensional code with the terminal device for device binding. The two-dimensional code may be randomly generated or may be printed on the XR device by the factory at delivery. After the target object scans the two-dimensional code with the terminal device, the target object may be prompted to register a platform account, or log in to an existing platform account for the subsequent binding procedure. Specifically, the mobile terminal may transmit user information to the XR device to request the risk control system to perform real-name registration and underage determining. The risk control system may return a user status after the real-name registration to the mobile terminal. The mobile terminal determines, according to the user status, whether to show a result to the target object. Specifically, after the binding to the terminal device is completed, it may be considered that an owner of the XR device is a bound account. The target object may use the bound account to perform device binding transfer, device locking, device payment channel binding, device theft deduction refund, and a series of other risk control operations on the XR device.

Specifically, after the binding to the terminal device is completed, PIN number setting verification may be performed. That is, a PIN number setting status is obtained from the PIN number service. When the PIN setting status indicates that the PIN number is not set, the target object is instructed to set the PIN number. Specifically, when the target object sets the PIN number, the system enters the key in different verification manners according to different service side settings, such as the pattern verification mode, the motion verification mode, the peripheral verification mode, the voice verification mode, the character password verification mode, the fingerprint verification mode, the iris verification mode, and the NFC verification mode. After the target object enters the PIN number for the first time, the system verifies the complexity of the PIN number and requests a second entry to ensure that the PIN number is accurate and avoid incorrect entry. After the entry is completed, the PIN number is encrypted and transmitted to the PIN number service, for storage by the PIN number service.

For example, during the setting of the PIN number, a plurality of verification modes may be provided for selection by the target object. The target object may select one or more from the plurality of verification modes for setting, such as the pattern verification mode, the motion verification mode, the peripheral verification mode, the voice verification mode, the character password verification mode, the fingerprint verification mode, the iris verification mode, or the NFC verification mode.

For example, when the target object selects the pattern verification mode, a plurality of patterns may be randomly displayed. The plurality of patterns have different shapes or colors, and the target object is instructed to select a particular number of patterns from the plurality of patterns as a preset pattern PIN number. During subsequent value transfer verification, similarly, a plurality of patterns are randomly displayed, and the target object is instructed to select a plurality of patterns as a pattern PIN number. The value transfer verification is performed by determining whether the pattern PIN number matches the preset pattern PIN number.

For example, when the target object selects the motion verification mode, the target object may be instructed to enter a motion through a peripheral such as a handle as a preset motion PIN number. During subsequent value transfer verification, similarly, the target object is instructed to enter a motion through a peripheral such as a handle, as a motion PIN number. The value transfer verification is performed by determining whether the motion PIN number matches the preset motion PIN number.

For example, when the target object selects the peripheral verification mode, the target object may be instructed to click/tap on at least one button a plurality of times through a peripheral such as a handle, as a preset peripheral PIN number. During subsequent value transfer verification, similarly, the target object is instructed to click/tap on at least one button a plurality of times through a peripheral such as a handle, as a peripheral PIN number. The value transfer verification is performed by determining whether the peripheral PIN number matches the preset peripheral PIN number.

For example, when the target object selects the voice verification mode, a voice PIN number entry interface may be displayed to instruct the target object to enter a preset voice PIN number. During subsequent value transfer verification, similarly, the target object is instructed to enter a voice PIN number by reading aloud. The value transfer verification is performed by determining whether the entered voice PIN number matches the preset voice PIN number. For example, the target object may read aloud a string of characters as the preset voice PIN number.

For example, when the target object selects the fingerprint verification mode, the target object is instructed to enter a fingerprint. When a fingerprint module is built in the XR device, the target object may be instructed to quickly place a finger in a fingerprint entry region of the XR device for fingerprint entry. Alternatively, when no fingerprint module is built in the XR device, a fingerprint module may be built in a connected peripheral, such as a handle. The target object may be instructed to quickly place a finger in a fingerprint entry region of the handle for fingerprint entry. During subsequent value transfer verification, the value transfer verification can be performed as long as the target object quickly places a finger in a fingerprint entry region of the XR device or the peripheral.

For example, when the target object selects the iris verification mode, the target object may be instructed to move eyeballs to allow an image acquisition module of the XR device to perform iris entry. During subsequent value transfer verification, the value transfer verification can be performed as long as the target object opens eyes. In addition, due to different textures, blood vessels, spots, and other subtle features on the iris, it is almost impossible to fine two people in the world with exactly the same irises. Moreover, these features are basically unchanged throughout life, thereby allowing the irises to have many advantages such as uniqueness, stability, anti-counterfeiting, and non-invasiveness over other biological features. Therefore, the efficiency of the value transfer verification can be greatly improved, and the security of the value transfer verification can also be greatly improved.

For example, an NFC module may be built in the XR device. When the target object selects the NFC verification mode, the target object may bring a wearable device that also has an NFC function close to the NFC module of the XR device for value transfer verification.

For example, when the XR device is bound to a wearable device, the target object may choose to perform the value transfer verification through the wearable device. For example, the value transfer verification may be performed by changing a device form of the wearable device. Using a wearable ring as an example, the value transfer verification may be performed by turning the ring to the left or right at a fixed angle, for example, 45 degrees.

For ease of understanding, referring to FIG. 7, module driving logic in a software development kit (SDK) of the XR device is described in the embodiments of this application. Specifically, a user interface module can provide a PIN number interface, a payment channel interface, an order interface, and a result interface. The PIN number interface can drive a PIN number module. The PIN number module supports a plurality of forms of PIN entry, and each PIN form may be designed as a sub-plugin of the entry module. After entry, the PIN number module uses a built-in analysis module to perform numerical analysis and morphological analysis to ensure that a PIN number entered by the target object meets user expectations. An escape module may perform signature escape on the PIN number to convert it into data that is easy to transmit. In addition, the payment channel interface, the order interface, and the result interface can drive a network communication module to allow the XR device and a server to communicate through a Protobuf (PB) protocol. After the corresponding data is obtained and decrypted, corresponding interface display and payment logic are completed.

Referring to FIG. 8, for ease of understanding, the following describes as a whole the value transfer procedure of the value transfer method provided in the embodiments of this application: Before the value transfer, the target object needs to complete the foregoing behaviors such as terminal device binding, PIN number setting, and payment channel binding. When the target object opens an application and purchases a product in the application, a value transfer request is generated. The XR device requests the payment engine to perform value transfer. First, the payment engine may perform verification on application merchant reliability, a user account status, an order status, and the like. Specifically, the payment engine may request an application status and a merchant status from the risk control system to perform verification on the reliability of the application and the merchant. The payment engine may further request an account status and configuration of the target object from the risk control system to perform verification on the account status. An order status may be further requested from the risk control system to perform verification on the order status. The order status includes a value amount to be transferred. The risk control system may confirm the order status according to the value amount to be transferred. When the value amount to be transferred exceeds a risk control threshold, a value transfer notification is transmitted to the bound terminal device for secondary confirmation. When the terminal device returns a confirmed status, the risk control system returns that the order status is normal, and the payment engine performs a subsequent operation. Then, the payment engine obtains payment channels bound to the XR device and an account balance, and returns them to the device system. The device system displays the payment channels for selection by the target object. After the target object selects a payment channel, the XR device displays verification prompt information, obtains interactive data of the target object, determines a PIN number (such as the pattern verification key, the motion verification key, or the trigger verification key described above) according to the interactive data, and transmits the PIN number to the payment engine to request fee deduction. The payment engine requests the PIN number service to perform PIN number verification. When the verification succeeds, the fee deduction is performed through the payment channel selected by the target object. After the fee deduction is completed, the merchant is notified to deliver the product and a delivery status is queried. Subsequently, the delivery status is synchronized to the application, and the target object can know the delivery status through the application.

All the foregoing technical solutions may be arbitrarily combined to form an embodiment of this application, and details are not described herein again.

In the embodiments of this application, verification prompt information matching a value transfer request is displayed in a virtual environment of a wearable device based on the value transfer request, the verification prompt information being used for instructing a target object to perform value transfer verification. Subsequently, interactive data generated by the target object in the virtual environment based on the verification prompt information is obtained, and value transfer verification is performed based on the interactive data. After the value transfer verification succeeds, value transfer is performed according to the value transfer request. This reduces operation complexity of the target object during the value transfer verification. In addition, the value transfer verification is performed in the virtual environment of the wearable device, and the target object can perform the value transfer verification without removing (such as taking off) the wearable device, thereby ensuring the user experience and helping balance the user experience and value transfer security.

Figure 9:
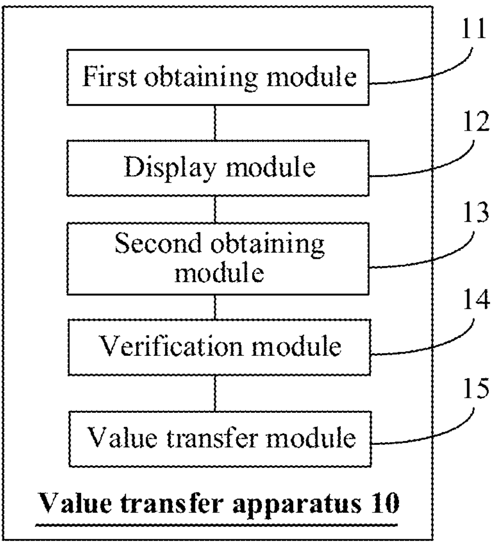
FIG. 9 is a schematic structural diagram of a value transfer apparatus according to an embodiment of this application.

To better implement the value transfer method in the embodiments of this application, the embodiments of this application further provide a value transfer apparatus. Referring to FIG. 9, FIG. 9 is a schematic structural diagram of a value transfer apparatus according to an embodiment of this application. The value transfer apparatus 10 includes:

- a first obtaining module 11, configured to obtain a value transfer request;
- a display module 12, configured to display verification prompt information matching the value transfer request in a virtual environment of the wearable device based on the value transfer request, the verification prompt information being used for instructing a target object to perform value transfer verification;

a second obtaining module 13, configured to obtain interactive data generated by the target object in the virtual environment based on the verification prompt information;

a verification module 14, configured to perform value transfer verification based on the interactive data; and a value transfer module 15, configured to perform value transfer according to the value transfer request after the value transfer verification succeeds.

In some embodiments, the verification prompt information includes pattern verification prompt information. The display module 12 may be configured to: display the pattern verification prompt information in the virtual environment of the wearable device, the pattern verification prompt information including a plurality of patterns and first prompt information, the first prompt information being used for instructing the target object to select a plurality of target patterns from the plurality of patterns, the plurality of patterns each having a different shape or color, and the interactive data including the plurality of target patterns. The verification module 14 may be configured to: determine whether the plurality of target patterns match a preset pattern key prestored in the wearable device; and when the plurality of target patterns match the preset pattern key prestored in the wearable device, determine that the value transfer verification succeeds; or when the plurality of target patterns do not match the preset pattern key prestored in the wearable device, determine that the value transfer verification fails.

In some embodiments, the value transfer apparatus 10 may further include a first interface display module that may be configured to: display a pattern key setting interface before the verification prompt information matching the value transfer request is displayed in the virtual environment of the wearable device based on the value transfer request, the pattern key setting interface displaying a plurality of patterns to be selected, and the plurality of patterns to be selected each having a different shape or color; and determine, as the preset pattern key, a pattern selected by the target object from the plurality of patterns to be selected.

In some embodiments, the verification prompt information includes motion verification prompt information, and the wearable device is connected to at least one peripheral. The display module 12 may be configured to: display the motion verification prompt information in the virtual environment of the wearable device, the motion verification prompt information being used for instructing the target object to input a motion verification key within a first preset time through the peripheral, and the interactive data including the motion verification key. The verification module 14 may be configured to: in response to obtaining the interactive data within the first preset time by the wearable device, verify whether the motion verification key matches a preset motion key prestored in the wearable device; and when the motion verification key matches the preset motion key prestored in the wearable device, determine that the value transfer verification succeeds; or when the motion verification key does not match the preset motion key prestored in the wearable device, determine that the value transfer verification fails.

In some embodiments, the value transfer apparatus 10 may further include a second interface display module that may be configured to: display a motion key entry interface, the motion key entry interface being used for instructing the target object to enter a baseline motion key by using the peripheral; and in response to detecting that the target object has entered the baseline motion key by using the peripheral, determine the baseline motion key entered by the target object by using the peripheral as the preset motion key.

In some embodiments, the verification prompt information includes trigger verification prompt information, and the wearable device is connected to at least one peripheral. The display module 12 may be configured to: display the trigger verification prompt information in the virtual environment of the wearable device, the trigger verification prompt information being used for prompting the target object to input a trigger verification key within a second preset time through the peripheral, the peripheral including a plurality of buttons, the trigger verification key being a combination of the number of times and an order for triggering at least one of the plurality of buttons, and the interactive data including the trigger verification key. The verification module 14 may be configured to: in response to obtaining the interactive data within the second preset time by the wearable device, determine whether the trigger verification key matches a preset trigger key prestored in the wearable device; and when the trigger verification key matches the preset trigger key prestored in the wearable device, determine that the value transfer verification succeeds; or when the trigger verification key does not match the preset trigger key prestored in the wearable device, determine that the value transfer verification fails.

In some embodiments, the value transfer apparatus 10 may further include a third interface display module that may be configured to: display a trigger key setting interface, the trigger key setting interface being used for instructing the target object to input a baseline trigger key through the peripheral; and obtain the baseline trigger key input by the target object through the peripheral, and determine the baseline trigger key as the preset trigger key.

In some embodiments, the value transfer apparatus 10 may further include a binding module, configured to: in response to starting of the wearable device, determine whether the wearable device has been bound to a terminal device; and when the wearable device is not bound to the terminal device, instruct the target object to perform an operation of binding to the terminal device; or when detecting that the target object has completed the binding to the terminal device, instruct the target object to perform an operation of binding to a payment channel.

In some embodiments, the value transfer request includes a value amount to be transferred, and the first obtaining module 11 may be configured to: when the value amount to be transferred exceeds a preset value amount, transmit a value transfer notification to the terminal device bound to the wearable device, the value transfer notification being used for confirming the value transfer request by the target object; and receive confirmation information from the terminal device bound to the wearable device, the confirmation information being generated after the confirmation of the value transfer request.

In some embodiments, the value transfer apparatus 10 may further include a transmitting module that may be configured to: transmit a value transfer success notification to the terminal device bound to the wearable device after value transfer is performed according to the value transfer request.

In some embodiments, the value transfer apparatus 10 may further include a refund module that may be configured to: when a refund request transmitted by the terminal device bound to the wearable device is received within preset duration after the value transfer success notification is transmitted, perform a refund operation in response to the refund request.

In some embodiments, the value transfer apparatus 10 may further include a determining module that may be configured to: receive user information of the target object from the terminal device bound to the wearable device; and perform real-name verification on the target object according to the user information, or determine whether the target object is an underage user according to the user information.

In some embodiments, the display module is further configured to display value transfer success information in the virtual environment.

For functions of the modules in the value transfer apparatus 10 in the embodiments of this application, correspondingly refer to the specific implementations in the foregoing method embodiments. Details are not described herein again.

All or some of the units in the value transfer apparatus 10 may be implemented through software, hardware, or combinations thereof. The foregoing units may be built in or independent of a processor in the wearable device in the form of hardware, or may be stored in a memory of the wearable device in the form of software, so that the processor invokes and performs the operations corresponding to the foregoing units.

The value transfer apparatus 10 may be integrated into a terminal or a server with a memory and installed with a processor to have a computing capability, or the value transfer apparatus 10 is the terminal or the server.

In the value transfer apparatus 10 provided in this embodiment of this application, the first obtaining module 11 obtains a value transfer request, and the display module 12 displays verification prompt information matching the value transfer request in a virtual environment of a wearable device based on the value transfer request, the verification prompt information being used for instructing a target object to perform value transfer verification. Subsequently, the second obtaining module 13 obtains interactive data generated by the target object in the virtual environment based on the verification prompt information. Then, the verification module 14 performs value transfer verification based on the interactive data. After the value transfer verification succeeds, the value transfer module 15 performs value transfer according to the value transfer request. This reduces operation complexity of the target object during the value transfer verification. In addition, the value transfer verification is performed in the virtual environment of the wearable device, and the target object can perform the value transfer verification without removing (such as taking off) the wearable device, thereby ensuring the user experience and helping balance the user experience and value transfer security.

In some embodiments, this application further provides a wearable device, including a memory and a processor. The memory stores a computer program. When the processor executes the computer program, the steps in the foregoing method embodiments are implemented.

Figure 10:
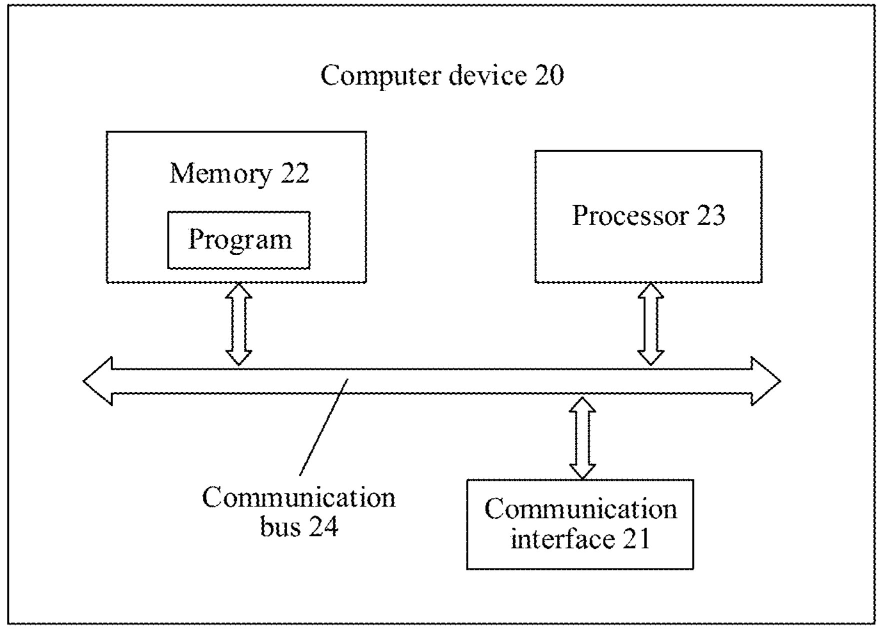
FIG. 10 is a schematic structural diagram of a wearable device according to an embodiment of this application.

FIG. 10 is a schematic structural diagram of a wearable device according to an embodiment of this application. Referring to FIG. 10, the wearable device 20 may include a communication interface 21, a memory 22, a processor 23, and a communication bus 24. The communication interface 21, the memory 22, and the processor 23 implement communication with each other through the communication bus 24. The communication interface 21 is used by the wearable device 20 to perform data communication with an external device. The memory 22 may be configured to store a software program and a module. The processor 23 runs the software program and the module stored in the memory 22, such as a software program of a corresponding operation in the foregoing method embodiments.

In some embodiments, the processor 23 may invoke the software program and the module stored in the memory 22 to perform the following operations: obtaining a value transfer request; displaying verification prompt information matching the value transfer request in a virtual environment of the wearable device based on the value transfer request, the verification prompt information being used for instructing a target object to perform value transfer verification; obtaining interactive data generated by the target object in the virtual environment based on the verification prompt information; performing value transfer verification based on the interactive data; and performing value transfer according to the value transfer request after the value transfer verification succeeds.

This application further provides a non-transitory computer-readable storage medium, configured to store a computer program. The computer-readable storage medium is applicable to a wearable device, and the computer program enables the wearable device to perform the corresponding procedure in the value transfer method in the embodiments of this application. For brevity, details are not described herein again.

This application further provides a computer program product. The computer program product includes a computer instruction. The computer instruction is stored in a computer-readable storage medium. A processor of a wearable device reads the computer instruction from the computer-readable storage medium. The processor executes the computer instruction, so that the wearable device performs the corresponding procedure in the value transfer method in the embodiments of this application. For brevity, details are not described herein again.

This application further provides a computer program. The computer program includes a computer instruction. The computer instruction is stored in a computer-readable storage medium. A processor of a wearable device reads the computer instruction from the computer-readable storage medium. The processor executes the computer instruction, so that the wearable device performs the corresponding procedure in the value transfer method in the embodiments of this application. For brevity, details are not described herein again.

It is to be understood that, the processor of the embodiments of this application may be an integrated circuit chip, having a signal processing capability. In an implementation process, the steps of the foregoing method embodiments may be performed by an integrated logic circuit in the form of hardware in the processor or instructions in the form of software. The processor may be a general-purpose processor, a digital signal processor (DSP), an application-specific integrated circuit (ASIC), a field-programmable gate array (FPGA), or other programmable logic devices, discrete gate or transistor logic devices, and discrete hardware components, and can implement or perform methods, steps, and logical block diagrams disclosed in the embodiments of this application. The general-purpose processor may be a microprocessor, any conventional processor, or the like. The steps of the method disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory (RAM), a flash memory, a read-only memory (ROM), a programmable ROM (PROM), an electrically-erasable programmable memory, or a register. The storage medium is located in the memory. The processor reads information in the memory and completes the steps of the methods in combination with hardware thereof.

It can be understood that the memory in the embodiments of this application may be a volatile memory or a non-volatile memory, or may include both a volatile memory and a non-volatile memory. The non-volatile memory may be a ROM, a PROM, an erasable PROM (EPROM), an electrically EPROM (EEPROM), or a flash memory. The volatile memory may be a RAM, serving as an external cache. Through illustrative rather than restrictive description, RAMs of many forms are available, for example, a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct Rambus RAM (DRRAM). The memory in the system and method described in this specification is intended to include, but is not limited to, these memories and a memory of any other suitable type.

It is to be understood that the foregoing memories are illustrative rather than restrictive description. For example, the memory in the embodiments of this application may alternatively be an SRAM, a DRAM, an SDRAM, a DDR SDRAM, an ESDRAM, an SLDRAM, and a DRRAM. In other words, the memory described in the embodiments of this application is intended to include, but is not limited to, these memories and a memory of any other suitable type.

A person of ordinary skill in the art may be aware that the exemplary units and algorithm steps described with reference to the embodiments disclosed in this specification can be implemented in electronic hardware, or a combination of computer software and electronic hardware. Whether these functions are performed in the manner of hardware or software depends on particular applications and design constraint conditions of the technical solutions. A person skilled in the art may use different methods to implement the described functions for each particular application, but it is not to be considered that such implementation goes beyond the scope of this application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it is to be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

If implemented in the form of software functional units and sold or used as an independent product, the functions may be stored in a non-transitory computer-readable storage medium. Based on such an understanding, the technical solutions of this application essentially, or the part contributing to the related art, or part of the technical solutions may be embodied in the form of a software product. The computer software product is stored in a storage medium and includes several instructions for instructing a computer device (which may be a personal computer or a server) to perform all or some of the steps of the methods described in the embodiments of this application. The storage medium includes any medium that can store program code, such as a USB flash drive, a removable hard disk, a ROM, a RAM, a magnetic disk, and an optical disc.

The foregoing descriptions are only specific implementations of this application, and the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A value transfer method performed by a wearable device, the method comprising:

obtaining a value transfer request including a value amount to be transferred;

determining whether the value amount exceeds a preset value amount;

in response to a determination that the value amount to be transferred exceeds the preset value amount, transmitting, by the wearable device, a value transfer notification associated with the value transfer request to a terminal device bound to the wearable device;

receiving, from the terminal device, confirmation information confirming the value transfer request associated with the value transfer notification;

in response to receiving the confirmation information from the terminal device, displaying verification prompt information matching the value transfer request in a virtual environment of the wearable device, the verification prompt information including an instruction to a user of the wearable device to input interactive data within a first preset time duration;

obtaining interactive data generated by the user of the wearable device in the virtual environment based on the verification prompt information, including capturing a motion of the user of the wearable device and displaying the motion of the user in the virtual environment of the wearable device in real time, wherein the motion of the user of the wearable device has a second preset time duration;

in response to obtaining the interactive data within the first preset time duration, performing value transfer verification based on the interactive data in response to determining that the motion of the user matches a preset verification key, the preset verification key comprising a preset motion having the second preset time duration;

performing value transfer according to the value transfer request after the value transfer verification succeeds;

transmitting a value transfer success notification to the terminal device bound to the wearable device; and in response to receiving, from the terminal device, a refund request associated with the value transfer success notification within a third preset time duration, automatically performing, by the wearable device, a refund operation associated with the value transfer request.

2. The method according to claim 1, wherein the displaying verification prompt information matching the value transfer request in a virtual environment of the wearable device comprises:

displaying pattern verification prompt information in the virtual environment of the wearable device, the pattern verification prompt information comprising a plurality of patterns and first prompt information, the first prompt information being used for instructing the user of the wearable device to select a plurality of target patterns from the plurality of patterns, the plurality of patterns each having a different shape or color, and the interactive data comprising the plurality of target patterns; and the performing value transfer verification based on the interactive data comprises:

determining whether the plurality of target patterns match a preset pattern key prestored in the wearable device; and when the plurality of target patterns match the preset pattern key prestored in the wearable device, determining that the value transfer verification succeeds; or when the plurality of target patterns do not match the preset pattern key prestored in the wearable device, determining that the value transfer verification fails.

3. The method according to claim 2, wherein the method further comprises:

displaying a pattern key setting interface including a plurality of patterns to be selected, and the plurality of patterns to be selected each having a different shape or color; and determining, as the preset pattern key, a pattern selected by the user of the wearable device from the plurality of patterns to be selected.

4. The method according to claim 1, wherein the displaying verification prompt information matching the value transfer request in a virtual environment of the wearable device comprises:

displaying motion verification prompt information in the virtual environment of the wearable device, the motion verification prompt information being used for instructing the user of the wearable device to input a motion verification key within a first preset time through a peripheral, and the interactive data comprising the motion verification key; and the performing value transfer verification based on the interactive data comprises:

in response to obtaining the interactive data within the first preset time by the wearable device, verifying whether the motion verification key matches a preset motion key prestored in the wearable device; and when the motion verification key matches the preset motion key prestored in the wearable device, determining that the value transfer verification succeeds; or when the motion verification key does not match the preset motion key prestored in the wearable device, determining that the value transfer verification fails.

5. The method according to claim 1, wherein the displaying verification prompt information matching the value transfer request in a virtual environment of the wearable device comprises:

displaying trigger verification prompt information in the virtual environment of the wearable device, the trigger verification prompt information being used for prompting the user of the wearable device to input a trigger verification key within a second preset time through a peripheral, the peripheral comprising a plurality of buttons, the trigger verification key being a combination of a number of times and an order for triggering at least one of the plurality of buttons, and the interactive data comprising the trigger verification key; and the performing value transfer verification based on the interactive data comprises:

in response to obtaining the interactive data within the second preset time by the wearable device, determining whether the trigger verification key matches a preset trigger key prestored in the wearable device; and when the trigger verification key matches the preset trigger key prestored in the wearable device, determining that the value transfer verification succeeds; or when the trigger verification key does not match the preset trigger key prestored in the wearable device, determining that the value transfer verification fails.

6. The method according to claim 1, wherein the method further comprises:

in response to starting of the wearable device, determining whether the wearable device has been bound to a terminal device; and when the wearable device is not bound to the terminal device, instructing the user of the wearable device to perform an operation of binding to the terminal device; and when detecting that the user of the wearable device has completed the binding to the terminal device, instructing the user of the wearable device to perform an operation of binding to a payment channel.

7. The method according to claim 1, wherein the method further comprises:

displaying value transfer success information in the virtual environment.

8. A wearable device comprising a processor and a memory, the memory storing a computer program that, when executed by the processor, causes the wearable device to perform a value transfer method including:

obtaining a value transfer request including a value amount to be transferred;

determining whether the value amount exceeds a preset value amount;

in response to a determination that the value amount to be transferred exceeds the preset value amount, transmitting, by the wearable device, a value transfer notification associated with the value transfer request to a terminal device bound to the wearable device;

receiving, from the terminal device, confirmation information confirming the value transfer request associated with the value transfer notification;

in response to receiving the confirmation information from the terminal device, displaying verification prompt information matching the value transfer request in a virtual environment of the wearable device, the verification prompt information including an instruction to a user of the wearable device to input interactive data within a first preset time duration;

obtaining interactive data generated by the user of the wearable device in the virtual environment based on the verification prompt information, including capturing a motion of the user of the wearable device and displaying the motion of the user in the virtual environment of the wearable device in real time, wherein the motion of the user of the wearable device has a second preset time duration;

in response to obtaining the interactive data within the first preset time duration, performing value transfer verification based on the interactive data in response to determining that the motion of the user matches a preset verification key, the preset verification key comprising a preset motion having the second preset time duration;

performing value transfer according to the value transfer request after the value transfer verification succeeds;

transmitting a value transfer success notification to the terminal device bound to the wearable device; and in response to receiving, from the terminal device, a refund request associated with the value transfer success notification within a third preset time duration, automatically performing, by the wearable device, a refund operation associated with the value transfer request.

9. The wearable device according to claim 8, wherein the displaying verification prompt information matching the value transfer request in a virtual environment of the wearable device comprises:

displaying pattern verification prompt information in the virtual environment of the wearable device, the pattern verification prompt information comprising a plurality of patterns and first prompt information, the first prompt information being used for instructing the user of the wearable device to select a plurality of target patterns from the plurality of patterns, the plurality of patterns each having a different shape or color, and the interactive data comprising the plurality of target patterns; and the performing value transfer verification based on the interactive data comprises:

determining whether the plurality of target patterns match a preset pattern key prestored in the wearable device; and when the plurality of target patterns match the preset pattern key prestored in the wearable device, determining that the value transfer verification succeeds; or when the plurality of target patterns do not match the preset pattern key prestored in the wearable device, determining that the value transfer verification fails.

10. The wearable device according to claim 9, wherein the method further comprises:

displaying a pattern key setting interface including a plurality of patterns to be selected, and the plurality of patterns to be selected each having a different shape or color; and determining, as the preset pattern key, a pattern selected by the user of the wearable device from the plurality of patterns to be selected.

11. The wearable device according to claim 8, wherein the displaying verification prompt information matching the value transfer request in a virtual environment of the wearable device comprises:

displaying motion verification prompt information in the virtual environment of the wearable device, the motion verification prompt information being used for instructing the user of the wearable device to input a motion verification key within a first preset time through a peripheral, and the interactive data comprising the motion verification key; and the performing value transfer verification based on the interactive data comprises:

in response to obtaining the interactive data within the first preset time by the wearable device, verifying whether the motion verification key matches a preset motion key prestored in the wearable device; and when the motion verification key matches the preset motion key prestored in the wearable device, determining that the value transfer verification succeeds; or when the motion verification key does not match the preset motion key prestored in the wearable device, determining that the value transfer verification fails.

12. The wearable device according to claim 8, wherein the displaying verification prompt information matching the value transfer request in a virtual environment of the wearable device comprises:

displaying trigger verification prompt information in the virtual environment of the wearable device, the trigger verification prompt information being used for prompting the user of the wearable device to input a trigger verification key within a second preset time through a peripheral, the peripheral comprising a plurality of buttons, the trigger verification key being a combination of a number of times and an order for triggering at least one of the plurality of buttons, and the interactive data comprising the trigger verification key; and the performing value transfer verification based on the interactive data comprises:

in response to obtaining the interactive data within the second preset time by the wearable device, determining whether the trigger verification key matches a preset trigger key prestored in the wearable device; and when the trigger verification key matches the preset trigger key prestored in the wearable device, determining that the value transfer verification succeeds; or when the trigger verification key does not match the preset trigger key prestored in the wearable device, determining that the value transfer verification fails.

13. The wearable device according to claim 8, wherein the method further comprises:

in response to starting of the wearable device, determining whether the wearable device has been bound to a terminal device; and when the wearable device is not bound to the terminal device, instructing the user of the wearable device to perform an operation of binding to the terminal device; and when detecting that the user of the wearable device has completed the binding to the terminal device, instructing the user of the wearable device to perform an operation of binding to a payment channel.

14. The wearable device according to claim 8, wherein the method further comprises:

displaying value transfer success information in the virtual environment.

15. A non-transitory computer-readable storage medium storing a computer program, the computer program, when executed by a processor of a wearable device, causes the wearable device to perform a value transfer method including:

obtaining a value transfer request including a value amount to be transferred;

determining whether the value amount exceeds a preset value amount:

in response to a determination that the value amount to be transferred exceeds the preset value amount, transmitting, by the wearable device, a value transfer notification associated with the value transfer request to a terminal device bound to the wearable device;

receiving, from the terminal device, confirmation information confirming the value transfer request associated with the value transfer notification;

in response to receiving the confirmation information from the terminal device, displaying verification prompt information matching the value transfer request in a virtual environment of the wearable device, the verification prompt information including an instruction to a user of the wearable device to input interactive data within a first preset time duration;

obtaining interactive data generated by the user of the wearable device in the virtual environment based on the verification prompt information, including capturing a motion of the user of the wearable device and displaying the motion of the user in the virtual environment of the wearable device in real time, wherein the motion of the user of the wearable device has a second preset time duration;

in response to obtaining the interactive data within the first preset time duration, performing value transfer verification based on the interactive data in response to determining that the motion of the user matches a preset verification key, the preset verification key comprising a preset motion having the second preset time duration;

performing value transfer according to the value transfer request after the value transfer verification succeeds;

transmitting a value transfer success notification to the terminal device bound to the wearable device; and in response to receiving, from the terminal device, a refund request associated with the value transfer success notification within a third preset time duration, automatically performing, by the wearable device, a refund operation associated with the value transfer request.

16. The non-transitory computer-readable storage medium according to claim 15, wherein the displaying verification prompt information matching the value transfer request in a virtual environment of the wearable device comprises:

displaying pattern verification prompt information in the virtual environment of the wearable device, the pattern verification prompt information comprising a plurality of patterns and first prompt information, the first prompt information being used for instructing the user of the wearable device to select a plurality of target patterns from the plurality of patterns, the plurality of patterns each having a different shape or color, and the interactive data comprising the plurality of target patterns; and the performing value transfer verification based on the interactive data comprises:

determining whether the plurality of target patterns match a preset pattern key prestored in the wearable device; and when the plurality of target patterns match the preset pattern key prestored in the wearable device, determining that the value transfer verification succeeds; or when the plurality of target patterns do not match the preset pattern key prestored in the wearable device, determining that the value transfer verification fails.

17. The non-transitory computer-readable storage medium according to claim 16, wherein the method further comprises:

displaying a pattern key setting interface including a plurality of patterns to be selected, and the plurality of patterns to be selected each having a different shape or color; and determining, as the preset pattern key, a pattern selected by the user of the wearable device from the plurality of patterns to be selected.

18. The non-transitory computer-readable storage medium according to claim 15, wherein the displaying verification prompt information matching the value transfer request in a virtual environment of the wearable device comprises:

displaying motion verification prompt information in the virtual environment of the wearable device, the motion verification prompt information being used for instructing the user of the wearable device to input a motion verification key within a first preset time through a peripheral, and the interactive data comprising the motion verification key; and the performing value transfer verification based on the interactive data comprises:

in response to obtaining the interactive data within the first preset time by the wearable device, verifying whether the motion verification key matches a preset motion key prestored in the wearable device; and when the motion verification key matches the preset motion key prestored in the wearable device, determining that the value transfer verification succeeds; or when the motion verification key does not match the preset motion key prestored in the wearable device, determining that the value transfer verification fails.

19. The non-transitory computer-readable storage medium according to claim 15, wherein the displaying verification prompt information matching the value transfer request in a virtual environment of the wearable device comprises:

displaying trigger verification prompt information in the virtual environment of the wearable device, the trigger verification prompt information being used for prompting the user of the wearable device to input a trigger verification key within a second preset time through a peripheral, the peripheral comprising a plurality of buttons, the trigger verification key being a combination of a number of times and an order for triggering at least one of the plurality of buttons, and the interactive data comprising the trigger verification key; and the performing value transfer verification based on the interactive data comprises:

in response to obtaining the interactive data within the second preset time by the wearable device, determining whether the trigger verification key matches a preset trigger key prestored in the wearable device; and when the trigger verification key matches the preset trigger key prestored in the wearable device, determining that the value transfer verification succeeds; or when the trigger verification key does not match the preset trigger key prestored in the wearable device, determining that the value transfer verification fails.

20. The non-transitory computer-readable storage medium according to claim 15, wherein the method further comprises:

in response to starting of the wearable device, determining whether the wearable device has been bound to a terminal device; and when the wearable device is not bound to the terminal device, instructing the user of the wearable device to perform an operation of binding to the terminal device; and when detecting that the user of the wearable device has completed the binding to the terminal device, instructing the user of the wearable device to perform an operation of binding to a payment channel.

* * * * *